United States Patent
Bascom et al.

(10) Patent No.: US 10,299,629 B2
(45) Date of Patent: May 28, 2019

(54) TRANSLATABLE INTERLOCKING MECHANISM FOR A BLENDING SYSTEM

(71) Applicant: VITA-MIX MANAGEMENT CORPORATION, Olmsted Township, OH (US)

(72) Inventors: James P. Bascom, Brecksville, OH (US); Scott C. Bly, Olmsted Falls, OH (US); Todd Cassidy, Medina, OH (US); Brenton Krivos, Brunswick, OH (US); Jeff Ransden, Olmsted Township, OH (US); Ray Adams, Olmsted Township, OH (US); Christian C. Stewart, Berea, OH (US)

(73) Assignee: VITA-MIX MANAGEMENT CORPORATION, Olmsted Township, OH (US)

(*) Notice: Subject to any disclaimer, the term of this patent is extended or adjusted under 35 U.S.C. 154(b) by 33 days.

(21) Appl. No.: 15/276,006

(22) Filed: Sep. 26, 2016

(65) Prior Publication Data

US 2017/0086621 A1    Mar. 30, 2017

Related U.S. Application Data

(60) Provisional application No. 62/232,778, filed on Sep. 25, 2015.

(51) Int. Cl.
| A47J 43/07 | (2006.01) |
| A47J 43/046 | (2006.01) |
| B01F 15/00 | (2006.01) |

(52) U.S. Cl.
CPC ......... *A47J 43/046* (2013.01); *A47J 43/0716* (2013.01); *A47J 43/0722* (2013.01); *B01F 15/00688* (2013.01); *B01F 2215/0014* (2013.01)

(58) Field of Classification Search
USPC ........................................... 366/205
See application file for complete search history.

(56) References Cited

U.S. PATENT DOCUMENTS

| 5,655,834 A * | 8/1997 | Dickson ................ A21C 1/14 241/282.1 |
| 6,595,113 B1 * | 7/2003 | Chang ................ A47J 43/0716 366/205 |
| 6,758,592 B2 | 7/2004 | Wulf et al. |
| 2005/0068847 A1 * | 3/2005 | Sands ................ A47J 19/027 366/205 |
| 2011/0013478 A1 * | 1/2011 | Athey ................ A47J 43/0766 366/205 |

(Continued)

FOREIGN PATENT DOCUMENTS

WO    20140144638    9/2014

*Primary Examiner* — Mark Halpern
(74) *Attorney, Agent, or Firm* — McDonald Hopkins LLC

(57) ABSTRACT

A blending system is shown and described herein. The blending system may include a base including a motor, a blade base assembly selectively and operably engaged with the base, where the motor drives a blade assembly of the blade base, and a blending container engageable with the blade base. The blade base may be configured to prevent driving of the blade assembly when the blending container is not engaged with the blade base assembly. The blade base may be engaged with the blending container and the blade assembly may mechanically engage with the motor.

20 Claims, 16 Drawing Sheets

(56) References Cited

U.S. PATENT DOCUMENTS

2011/0222367 A1* 9/2011 Allen ................. A47J 43/0716
366/206
2011/0248108 A1* 10/2011 Carriere ............. A47J 43/0722
241/33
2014/0286123 A1 9/2014 Arnett et al.

* cited by examiner

TRANSLATABLE INTERLOCKING MECHANISM FOR A BLENDING SYSTEM

CROSS-REFERENCE TO RELATED APPLICATIONS

This application claims the benefit of U.S. Provisional Patent Application No. 62/232,778 entitled "TRANSLATABLE INTERLOCKING MECHANISM FOR A BLENDING SYSTEM," filed on Sep. 25, 2015, which is incorporated herein by reference in its entirety.

TECHNICAL FIELD

The present teachings relate to a blending system, and more particularly, to a translatable interlocking mechanism for a blending system.

BACKGROUND

Blending systems are often used to blend and process foodstuffs. In recent years, personal blending systems have been developed with blending containers that are designed to serve a dual purpose and function as both a blending container and a drinking vessel. Typically, the container may include the foods for blending and then will connect at its top with a blade assembly. Once connected, the user may invert the container/blade assembly so that the container/blade assembly engages with the personal blending system base. Once blending is completed, the user may remove the container/blade assembly from the base, invert it again, and remove the blade assembly from the cup. The user can then directly drink from that container, or insert a top on the container for later use.

The personal blending system may have an interface between the container and the blade assembly, such as an O-ring. This interface may generally prevent liquid from leaking out of the container when attached to the blade assembly. That O-ring may typically include a solid round or square cross-sectional shape. This shape may generally create an air-tight seal between the two structures.

However, those conventional personal blending systems have relatively small motors and thus, do not observe the potential pressure build-up in the container as would a blender with a high performance motor, such as a 2 horsepower (HP) motor. As a result, the use of a conventional sealing system with a high performance blender can create an undesirable high pressure condition within the container.

SUMMARY

A blending system may include a blender base, which may encase a motor, and a blade base in operative communication with the motor. The motor may be selectively engaged with the blender base. The blade base may be operatively engaged with a blending container. The blade base may be translated from a first position to a second position based on the connection status of a blending container.

When the blending container is not engaged with the blade base, the blade base may be in a first position. In the first position, a spline of the blade base may be disengaged with a splined coupler of the blender base. In a second position, the spline of the blade base may be translated towards the splined coupler such that the splined coupler is engaged with the spline.

A blending system may include a blade base, a blending container, and a blender base. The blade base may be engaged with the blending container to allow the blade base to be coupled with the blender base. When not coupled to the blending container, a blade assembly of the blade base may not engage a motor of the blender base.

DESCRIPTION OF THE DRAWINGS

The present teachings may be better understood by reference to the following detailed description taken in connection with the following illustrations, wherein.

DETAILED DESCRIPTION

Figure 1:
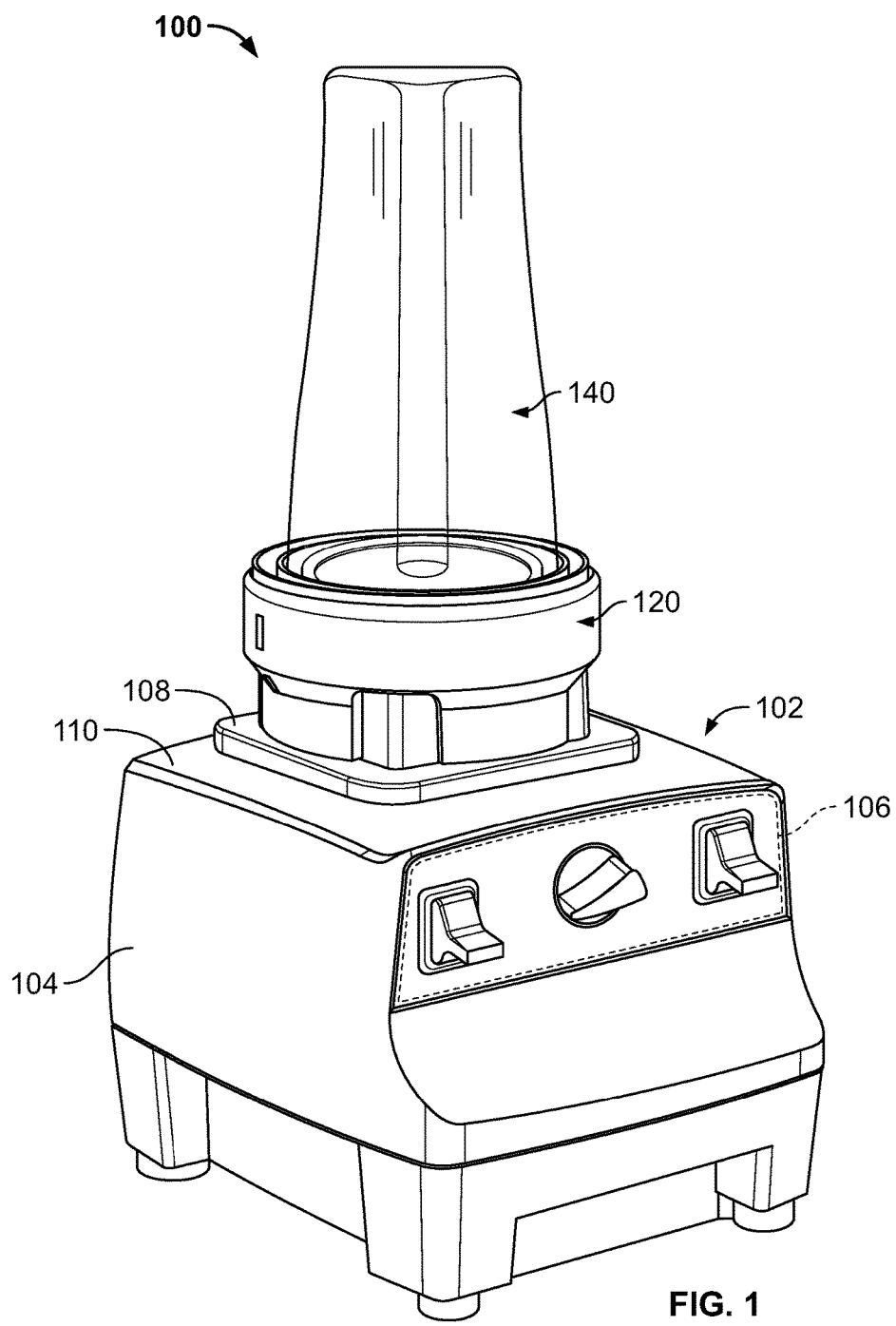
FIG. 1 is a perspective view of a blender system with a blender base, a blade base, and a blending container, in accordance with various disclosed aspects.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blender systems, various other food preparation systems, and the likes. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference.

Foodstuff may be added to the blender container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the likes. Further, the blender systems may include any household blender and/or any type of commercial blender system, including those with covers that may encapsulate or partially encapsulate the blender. Further, commercial blender systems may include an overall blender system, such as a modular blender system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In an embodiment, the blender assembly may include a blender container and a blade assembly. The blender container may comprise a pitcher, bowl, cup, or other general shape. It is noted that the blender container may be configured for single serving use, commercial use, multi-serving use, or the like. The blender container may include or be coupled with (e.g., removably or irremovably) a blade assembly. The blade assembly may include one or more blades having one or more wings. It is noted that a blade assembly may be monolithically formed or formed of separate constructions assembled together.

In another aspect, a blending system may comprise a blender base having a pedestal engageable with a blade base. The blade base may be engageable with a blending container. The blade base, or a portion thereof, may be movable or translatable between different positions. For instance, the blade assembly may be movable relative other portions of the blade base. In one position, the blade assembly may be disposed such that it cannot operatively engage with a splined coupler. In this position, the spline is physically disposed out of contact or engagement with a splined coupling of the blender base. In another position, the blade assembly may be disposed such that the spline may operatively engage a splined coupling of a blender base. The blade assembly may be moved between positions.

The position of the blade assembly may depend on whether the blending container is operatively attached to the blade base. For instance, the blade may be in the first position when the blending container and the blade base are not attached. In this first position, the spline may be disposed such that it is physically separated from the blade base when the blade base is attached to the blender container. This may provide a physical stop or barrier between the spline and the splined coupling. The physical stop may prohibit the splined coupling of the blender base from driving the blade assembly.

When the blending container is engaged with the blade base, the blade assembly may be may be allowed to translate or transition to a second position. In this second position, the spline is disposed such that it may be engaged with the splined coupling when the blade base is attached to the blender base. To transition the blade between positions, a user may rotate the blending container relative to the blade base. This may seal the blending container and the blade base, while allowing the spline with the splined coupling.

In at least one embodiment, a blade base may be movable between an engageable position or orientation and a non-engageable orientation. In the non-engageable orientation, a portion of the blade base may prevent the blade base from engaging with a blender base. In the engageable orientation, the portion of the blade base that prevented the blade base from engaging with a blender base may be moved or disposed such that the blade base operatively engages with a blender base. It is noted that blade base may be in the non-engageable orientation when the blending container is not engaged with the blade base. When the blending container is operatively engaged with the blender base, the blade base may be in the engaged orientation.

While embodiments may refer to movement of one or more components, it is noted that movement is described with a component as being stationary at least for simplicity of explanation. For instance, while a floating bowl or a blade assembly may be described as moving, in other embodiments a pedestal may move. In another aspect, both the floating bowl and the pedestal may move. Accordingly, embodiments are not limited to particular described movements. For sake of brevity, however, examples may generally refer to the pedestal being relatively stationary. In an example, embodiments may include a fixed bowl (e.g., a bowl in a fixed position relative to a blade base and/or other components). For instance, a bowl may be in a fixed position and a physical shield or blocking member may block and/or prevent a blade base from engaging with a spindled coupling of the blender base.

FIG. 1 is a blending system 100 in accordance with various disclosed aspects. The blending system 100 may primarily include a blender base 102, a blending container 140, and a blade base 120. The blade base 120 may be selectively and operatively coupled with the blender base 102 and the blending container 140 as described in more detail below. The blending container 140 may comprise an appropriate shape for a desired application. For instance, the blending container 140 may be generally cylindrical, bell-shaped, cup-shaped, pitcher-shaped, or the like. In at least one embodiment, the blending container 140 may comprise a single serving container (e.g., a container that it is a smaller size than a standard blender.) For instance, the blending container 140 may also be of a configuration to act as a drinking vessel. In another aspect, the blending container 140 may be a variety of sizes, including, but not limited to, a 20 oz., 24 oz., 32 oz., a 40 oz., or other desires size. It is noted that the blending container 140 may be single walled and/or may include ribs or other formations disposed on or protruding from an inner surface. The formations may assist in agitation of food stuff, such as by disrupting vortex formation. It is further noted that the blending container 140 may include grips or ergonomic formations on an external service, which may alter (e.g., improve) usability of the blending container 140. In another aspect, the blending container 140 may include one or more walls, such as two walls (e.g., an inner wall and an outer wall).

The blending system 100 may include an interlocking mechanism that may generally prevent operation of at least a portion of the blending system 100 (e.g., rotation of blades) when and if the blending container 140 and blade base 120 become disengaged as described in more detail below. The blending container 140 may have a smaller configuration than traditional blending containers or large format blending containers. In aspect, the blender base 102 may have a smaller footprint and smaller profile than traditional blending systems. In at least one aspect, the blending system 100 may be considered a personal or individual blending system. However, it is noted that the present teachings are not limited to personal blending system and may be applied to various other blending systems as described herein.

The blender base 102 may include a housing 104 that may comprise a motor. The housing 104 may be any appropriate size and configuration. For instance, the housing 104 may be configured to house and generally protect the operative components of the blending system 100, such as a high performance motor, gearing, sound damping components, and fan. These operative components may be of any appropriate configuration—the present teachings are not limited to any specific configuration. It is noted that the blender base 102 may include other components, such as vents (which may facilitate exhaustion of air generated within the blender base 102), a power cord (which may be configured to operatively communicate with a power supply source to provide the appropriate power to operate the blending system 100), non-skid pads or feet (which may be configured to prevent or reduce slippage of the blender base 102), or the like. Such components may be of any appropriate configuration—the present teachings are not limited to any specific configuration.

In an aspect, a control panel 106 may be disposed on the housing 104. The control panel 106 may be of any appropriate configuration and may be utilized to set the operative condition of the blending system 100 by the user. By way of a non-limiting example, the control panel 106 may include one or more interfaces that may comprise controls, such as knobs, switches, touch panels, LCD or LED displays, buttons, or the like. The controls may selectively adjust settings of the blending system 100, including, without limitation setting rotational speed of blades, setting blending patterns (e.g., pulse, continuous blending, etc.), powering on/off the blending system 100, or the like.

In at least one embodiment, the blender base 102 may include a pedestal 108 at a top portion 110 of the blender base 102. The pedestal 108 may be of any appropriate shape and size and can be materially, integrally formed with the blender base 102. By way of a non-limiting example, the pedestal 108 may be sized and shaped to cooperate with the blade base 102 as described in more detail herein. The pedestal 108 may be of a shape such that an interior of the pedestal 108 corresponds with the external shape of the blade base 120. It is noted that he pedestal 108 may be configured to operatively accept a large container (e.g., a 64 oz. container) or various other containers.

In an aspect, blending system 100 is depicted in an interlocked position where foodstuff may be blended within the blending container 140. For instance, blending container 140 may be interlocked or secured to the blender base 120 (e.g., blender base 120 is in an engageable orientation), as described in more detail herein. In another aspect, the blender base 120 may be interlocked or engaged with the blender base 102.

Figure 2:
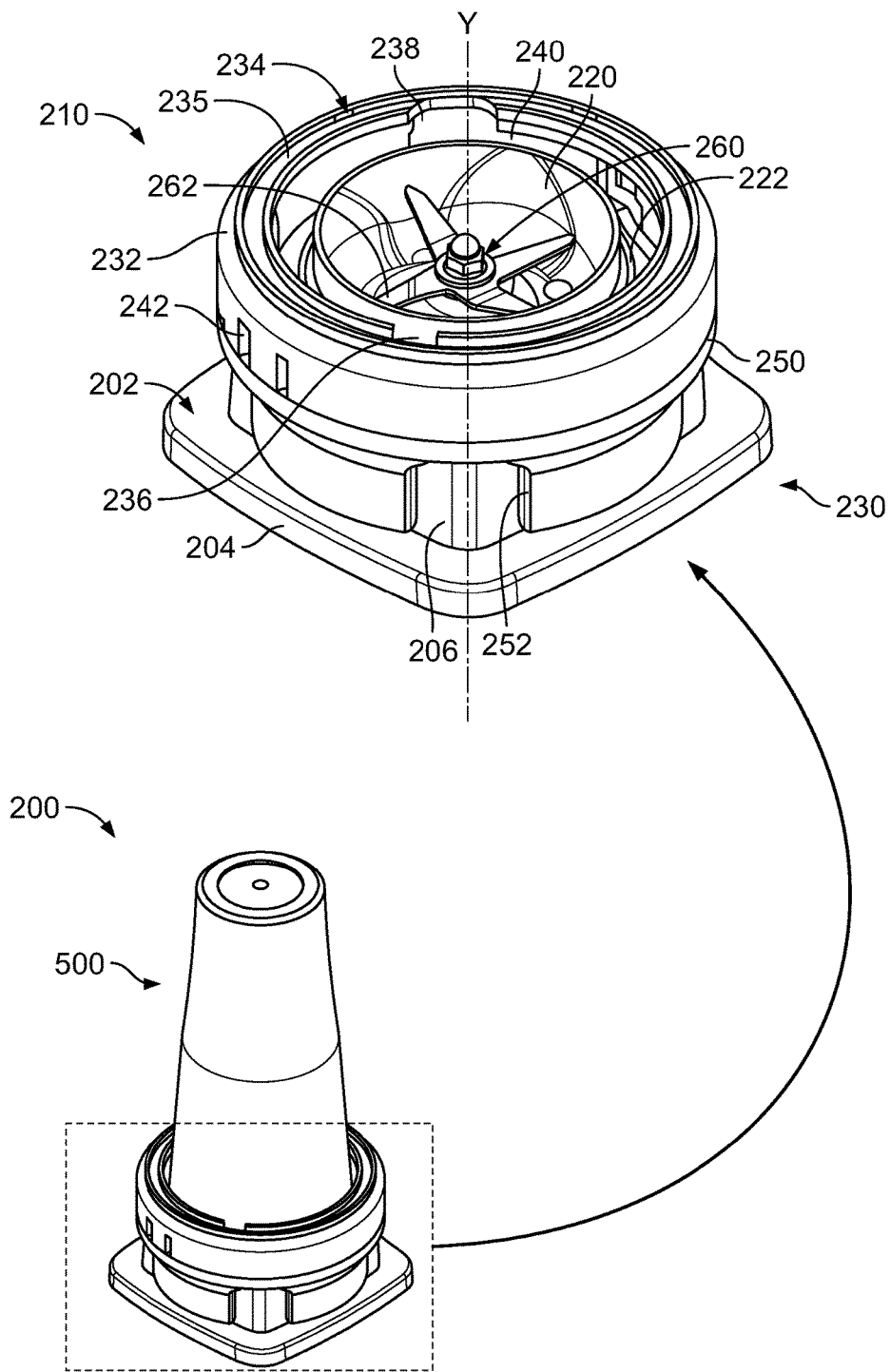
FIG. 2 is a perspective view of a blade base of an interlocking mechanism for a blender in a locked position, in accordance with various disclosed aspects.
Figure 3:
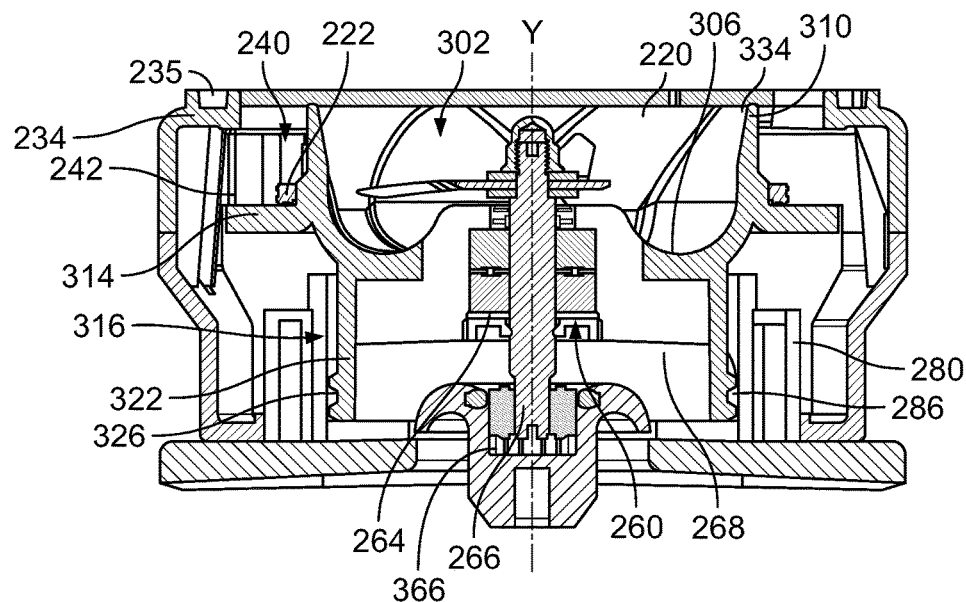
FIG. 3 is a cross-sectional view of the blade base in the locked position, in accordance with various disclosed aspects.
Figure 4:
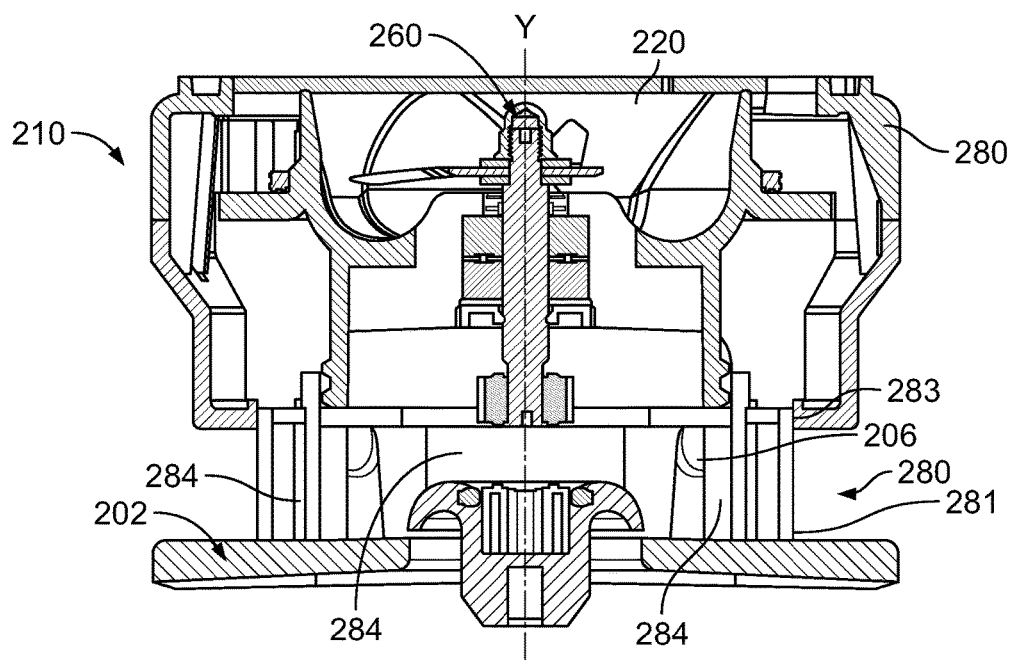
FIG. 4 is a cross-sectional view of the blade base in an unlocked position, in accordance with various disclosed aspects.

With reference to FIGS. 2-4, depicted are various views of an interlocking mechanism 200, which may comprise a portion of a blender system, that may comprise a pedestal 202 (which may comprise a portion of a blender base and/or may be generally similar to pedestal 108) a blade base 210, and a blender container 500. As shown at least in FIG. 2, blade base 210 may be in an interlocked position with the pedestal 202. It is noted that in at least one embodiment, blade base 210 will not interlock with pedestal 202 without blender container 500 interlocking with the blade base 210. By preventing interlocking of the blade base 210 and pedestal 202 without the container, blades 262 may be prevented from rotating. In an aspect, this may reduce potential for unintended rotation of the blades 262.

It is noted that interlocking mechanism 200 may include additional and/or other components. While components may be described as separate components, it is further noted that various components may be monolithically formed or may be attached (e.g., removably or irremovably) through a subsequent operation. In another aspect, the various components may comprise one or more materials, as described herein. As such, described embodiments may refer to particular configurations, materials, or the like, for sake of explanation and brevity, but embodiments of the present disclosure are not limited to such.

Blade base 210 may be shaped and sized to operatively engage with pedestal 202 in an appropriate manner. For instance, blade base 210 may include a housing 230. The housing 230 may include one or more alignment windows or aligners 252 that operatively align the housing with the pedestal 202. The pedestal 202 may include protrusions or feet 206 206 that operatively engage with the alignment members 252. The alignment members 252 may be sized and shaped to receive the feet 206 of the pedestal 202. For example, the feet 206 may protrude from a body 204 of the pedestal 202. In an aspect, the pedestal 202 may include m feet 206, and the blade base 210 may include n alignment members 252, where m and n are numbers; e.g., the pedestal 202 may include the same or a different number of feet 206 as the number of alignment members 252. As illustrated the pedestal 202 may comprise four feet 206 and the blade base 210 may comprise four alignment members 252.

When aligned, the alignment members 252 may engage with the feet 206 to ensure proper alignment and/or to prevent or limit movement of the blade base 210, such as during operation of the blender. It is noted that embodiments may comprise a differently shaped, sized, and/or a different number of feet 206 and/or alignment members 252. It is further noted that various embodiments may comprise different configurations that allow the blade base 210 to engage with pedestal 202, such various are considered within the scope and spirit of this disclosure. Further still, the location of the alignment members 252 may be such that the blade base 210 can only engage a specific configuration of feet 206. This may prevent the blade base 210 from being operatively coupled to a certain blending device it is not so intended to be operatively coupled. For example, if there is a model or models of blending devices to which the manufacturer does not wish to utilize the blade base 210 with, they can alter the configuration of the alignment members 252 to prevent operative engagement with the feet of such blending device.

According to embodiments, the blade base 210 may primarily comprise a floating bowl 220 (which may rotate with a container relative to the blade base 210), a housing 230, a blade assembly 260, and a jacking feet 280. The housing 230 may house or cover operative components of the blade base 210 as described in more detail herein. In embodiments, the housing 230 may comprise an upper housing 232 and a lower housing 250, which may be attachable to each other (e.g., removably or irremovably) and/or monolithically formed. In to at least one embodiment, the lower housing 250 may comprise a generally cylindrical body and may comprise one or more alignment members 252.

In an aspect, the jacking feet 280 may be attached and/or comprised by the blade base 210. The jacking feet 280 may include a distal end 281 that contacts the blender base (e.g., blender base 102) or pedestal 202, and a proximal end 283 generally opposed to the distal end 281. The floating bowl 220 may be operatively attached to the jacking feet 280. In another aspect, the floating bowl 220 may operatively move towards or away from the distal end 281 about an axis Y.

Floating bowl 220 may include a jacking portion 316 extending from the closed end 306 opposite a cavity portion 302 of the floating bowl 220. The jacking portion 316 may comprise side wall 322. The side wall 322 may protrude generally perpendicularly from a plane of the closed end 306. In an aspect, the side wall 322 may comprise a generally cylindrical or tubular wall. According to at least one embodiment, side wall 322 may include an engaging portion 326 configured to operatively and selectively secure with an engaging portion 286 of the jacking feet member 280.

The engaging portions 326 and 286 may be of any appropriate configurations. By way of a non-limiting example, the engaging portions 326 and 386 may comprise male/female threaded portions configured to mate with each other. In an aspect, either engaging portions 326 and 386 may be a male turned engaging portion while the other is a female turned engaging portion. It is noted that the engaging portions may comprise other configurations, such as channel locks, bayonet type locks, or the like.

Figure 5:
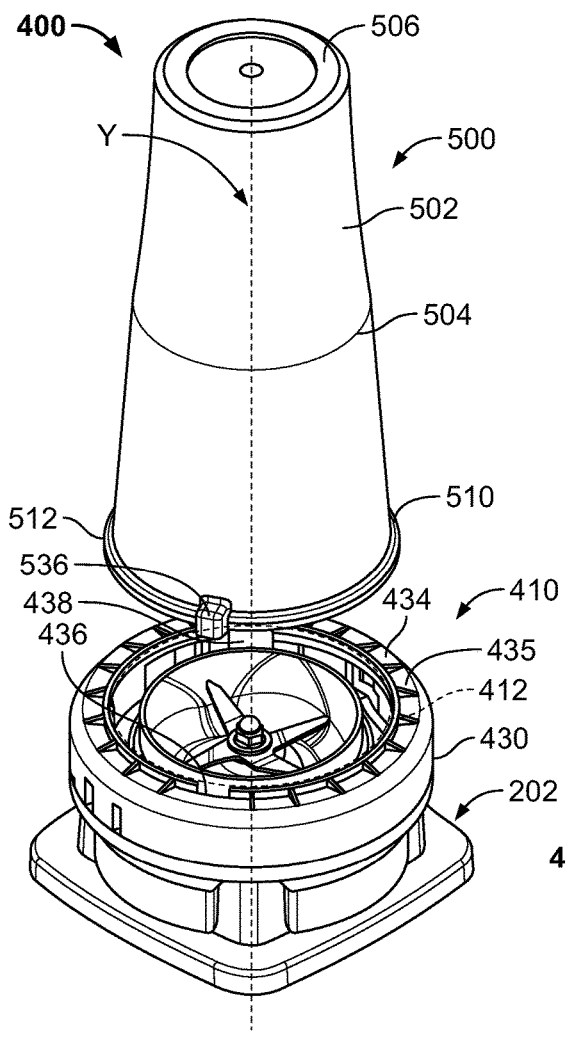
FIG. 5 is a perspective view of another blade base of an interlocking mechanism for a blender in an unlocked position, in accordance with various disclosed aspects.
Figure 6:
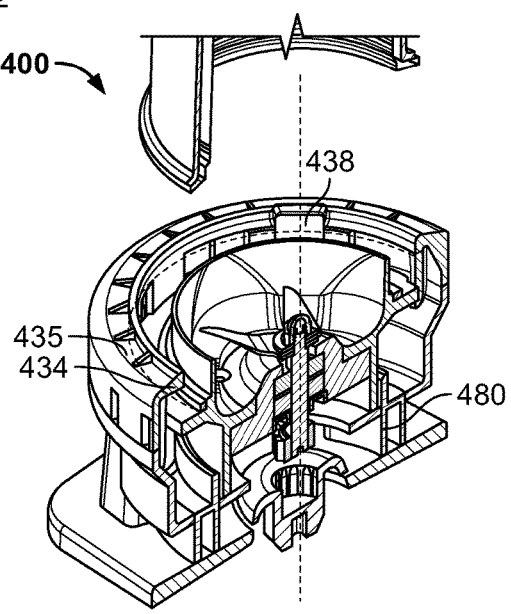
FIG. 6 is a cross-sectional view of the blade base in the unlocked position, in accordance with various disclosed aspects.

As described herein, jacking feet member 280 may be configured to contact the pedestal 202 in both an interlocked position or engageable orientation (e.g., FIGS. 3, 7-8, etc.) and in an unlocked position or non-engageable orientation (e.g., FIGS. 4-6, etc.). It is noted that the relative positions of the jacking feet member 280 and the other components of the blade base 210 may alter. For instance, as shown in FIGS. 3 and 4, the floating bowl 220, housing 230, and blade assembly 260 may be translatable about the axis Y, while jacking feet member 280 remains generally stationary. It is further noted that the embodiments may include jacking feet member 280 moving while other components remain stationary, such may depend on a desired point of reference. Accordingly, at least for brevity, embodiments described herein refer to jacking feet member 280 as a reference point that remains stationary while the relative position may alter.

Figure 11:
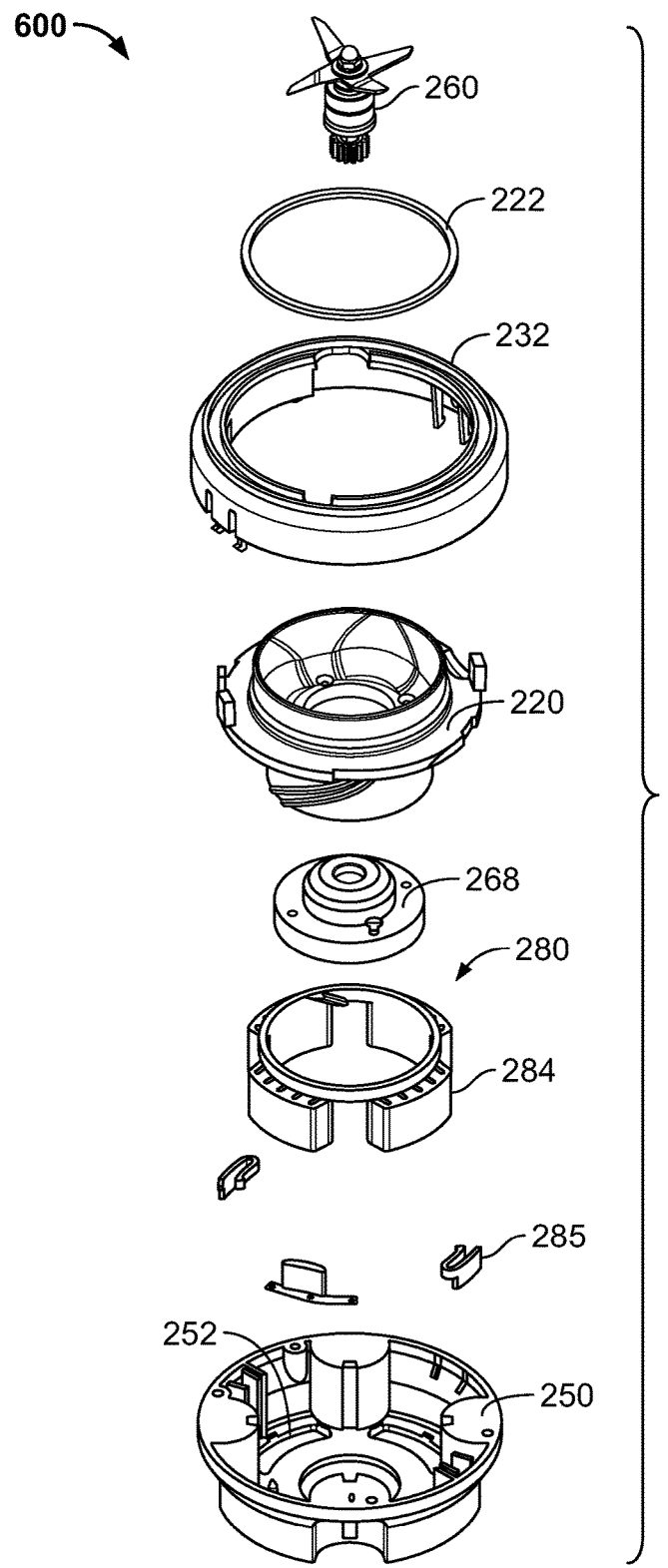
FIG. 11 is an exploded view of a blade base, in accordance with various disclosed aspects.

Turning to FIG. 11 with reference to FIGS. 2-4, there is an exploded view 600 of blade base 210. As can be seen, the jacking feet member 280 may include one or more feet 284 that may comprise one or more engaging portions 286. In an aspect, the one or more feet 284 may be sized and shaped to engage with feet 208 of the pedestal 202. For instance, the jacking feet member 280 may comprise four feet configured to engage with the four feet 208 of the pedestal 202. As noted here as well as elsewhere, the jacking feet member 280 may comprise a different number of, size of, or shape of feet 284. The feet 284 may protrude through one or more apertures 252 in the bottom housing 250. The blade base 210 may include one or more detent catches 285 that reduce the ability of the blade base 210 from moving from the engageable orientation to the non-engaged orientation.

In embodiments, the floating bowl 220 may be translated about the axis Y in response to operatively attaching the blending container 500 to the blade base 210. In an example, when the blending container 500 is properly engaged with the blade base 210, the blade base 210 may engage with the jacking member 280 to allow the engaged blending container 500 and blade base 210 to rotated or otherwise moved into a position that may allow operation of the blade assembly 260.

If the blending container 500 is not properly engaged with the blade base 210, the jacking member 280 may prevent the engaged blending container 500 and blade base 210 from being rotated or otherwise moved into a position, thereby preventing operation of the blade assembly 260. In addition, the jacking member 280 may prevent a portion of the blade assembly 260 (such as a male spline member) from operatively engaging the pedestal 202 (such as a female spline member).

The upper housing 232 may be generally cylindrical or disc-like in shape. It is noted that the upper housing 232 may comprise various other appropriate shapes (e.g., polygonal shapes, irregular shapes, etc.) and sizes. As illustrated in FIG. 3 as well as elsewhere, the upper housing 232 may comprise a lip 234. The lip 234 may comprise one or more walls that may define a spill moat 235. The spill moat 235 may be configured to receive foodstuff that may spill or otherwise flow from a container elsewhere. For example, if any foodstuff escapes from during operation, during insertion of the material to be blended or while expelling the material from the blending container 500, the spill moat 235 may collect or receive the spilled contents and prevent spreading of the material. The spill moat 235 may be of any appropriate configuration.

The spill moat 235 may be configured to capture any escaping contents and allow it to flow along a predetermined path. At a conclusion of the predetermined path of the spill moat 235, the upper housing 232 may include one or more recessed portions 236 and 238, such as shown in FIG. 2 as well as elsewhere. In an aspect, the recessed portions 236 and 238 may allow the contents to flow to a lower spill moat 240 which may be in fluid communication with one or more apertures 242. The one or more apertures 242 may be configured to allow contents to exit from the blade base 210. The combination of the spill moat 235, lower spill moat 240 and apertures 242 may generally prevent liquid from inadvertently entering a blender base (e.g., blender base 102) and more specifically from entering the working components of a blending system (e.g., blending system 100), such as the motor.

In embodiments, the lower spill moat 240 may be formed of a portion of the floating bowl 220 and the upper housing 232. The floating bowl 220 may comprise a cavity portion 302 that may be defined by a closed end 306 and side wall 310 extending therefrom. A moat surface 314 may protrude from the side wall 310. For instance, the moat surface 314 may protrude from an external perimeter of the floating bowl 220 in a direction towards the upper housing 232. The moat surface 314 may contact the outer housing 232 to prevent spilled contents from flowing into lower housing 250 and/or other components.

A gasket 222 may be disposed within the lower spill moat 240, such as proximal to an intersection of the side wall 210 and the moat surface 314. The gasket 222 may comprise a ring-like gasket 222 that may circumscribe the sidewall 310. In another aspect, the gasket 222 may be positioned such that, when blending container 500 is engage with the blender base 210, the gasket 222 may be between a portion of the blending container 500 and the floating bowl 302 as described in more detail herein. It is noted that the gasket 242 may be attached (e.g., removably or irremovably) to the floating bowl 302 and/or the blending container 500. In another aspect, the gasket may comprise an X-like shape, as described in U.S. patent application Ser. No. 14/195,159.

As shown and described in FIGS. 2 and 3, as well as elsewhere, the cavity portion 302 of the floating bowl 220 may generally comprise a bowl-like shape. In an aspect, the closed end 306 may comprise a concave or curved configuration. The closed end 306 may be of a shape to contribute to agitation of the flow of material during operation of a blending system. For example, the closed end 306 and may have a generally rectangular shape such as a generally square shape. In an aspect, corners or corner-like portions of the closed end 306 may contribute to altering flow of material, such as by agitating the material and/or disrupting vortex formation. In at least one embodiment, the closed end 306 may be generally circular or spherical. In another aspect of this disclosure, the side wall 310 may comprise one or more flow-impeding formations. The flow impeding formations may comprise indentations, protrusions, ribs, chamfered surfaces or the like. As an example, ribs may protrude from the side wall 310 generally towards blades 262.

In embodiments, the closed end 306 and/or the side wall 310 may include features to agitate the flow of material with the blender container 500. For instance, closed end 306 and/or the side wall 310 may include a protrusion or ribs extending towards axis Y. The protrusion may be of any appropriate shape and size, such as generally rounded, extending 2 mm from side wall 310, or the like. Such features may be monolithically formed with the closed end 306 and/or the side wall 310 or may be attached through a subsequent operation. In at least one embodiment, a protrusion may extend from a length of the side wall 310 from the closed end 306 to an open top end 334. It will be appreciated that the blade base 210 may include different numbers of flow impeding features. In another aspect, a flow impeding feature may include a ramped surface that may be of any appropriate configuration, including, without limitation being a helical ramp formed with the closed end 306 and/or the side wall 310.

As noted, the blade base 210 may comprise and/or be coupled with the blade assembly 260, which may include a bearings 268. The bearings 268 may secure the blade assembly 260 to the blade base 210. In another aspect, the blade assembly 260 may generally include blades 262, a drive train 264, and bearings 268, a blade spline 266. The blades 262 may be of any appropriate configuration, type and size. The present teachings are not limited to the configuration shown and described. By way of a non-limiting example, the blades 262 can be of a conventional blender blade configuration and, as such, includes a plurality of radially extending blades 262 that are carried by, and positioned above closed end 306 by a vertically oriented drive train 264. The drive train 264 may include a blade shaft, bearings, and the like that extend downwardly through a hub and, when connect to a blender system, towards pedestal 202. One or more bearings 268 may circumscribe at least a portion of the drive train 264 to provide stabilization of the blade assembly 260. It is noted that the one or more bearings may comprise over mold bearing housings, stamped metal bearing housing, or the like. It is further noted that at least a portion of the bearings 268 may extend through and/or comprise at least a portion of the closed end 306.

In at least one embodiment, drive train 264 may include a spline 266 which may be secured (e.g., removably or irremovably) to the end of the blade shaft. The spline 266 may engage with a splined coupler 366 positioned within the pedestal 202, the splined coupler 366 being connected to a motor shaft. Accordingly, when the blade base 210 is positioned within the pedestal 202 and in an interlocked position (e.g., as shown in FIGS. 2 and 3), rotation of the motor shaft caused by actuation of the motor is thereby transferred to the blades 262, which are rotatably positioned within the blade base 210. When in another position (e.g., an open or unlocked position), the spline 266 may be disengaged with the splined coupler 366, as shown in FIGS. 4-6 and described in more detail herein.

Figure 7:
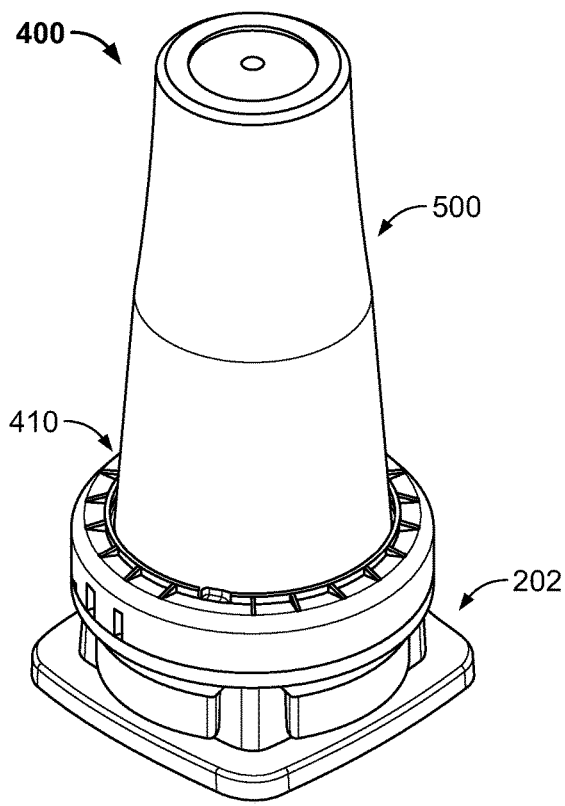
FIG. 7 is a perspective view of the blade a locked position, in accordance with various disclosed aspects.
Figure 8:
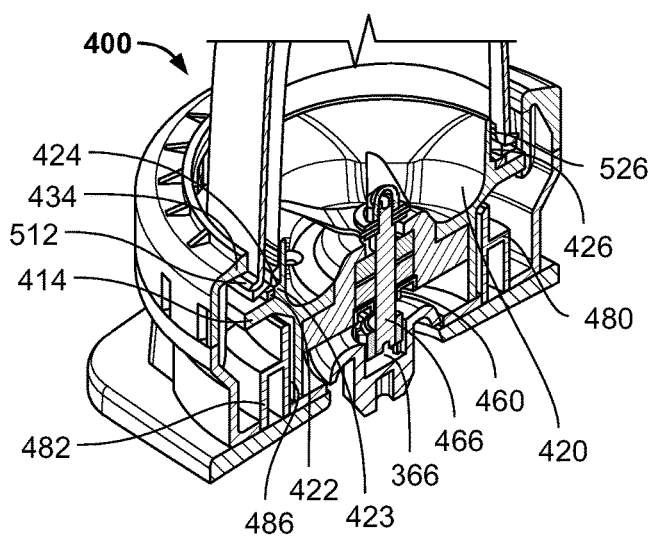
FIG. 8 is a cross-sectional view of the blade base in the locked position, in accordance with various disclosed aspects.

Turning now to FIGS. 5-8, with reference to the other figures, illustrated is an interlocking mechanism 400 that is described as moving from a first or unlocked position (e.g., as seen in FIGS. 5-6) to a second or interlocked position (e.g., as seen in FIGS. 7-8). It is noted that embodiments may utilize other interlocking mechanism and/or methods to translate components of the interlocking mechanism 400 about axis Y. As such, described examples are considered non-limiting and non-exclusive. It is further noted that interlocking mechanism 400 may be substantially similar to other described interlocking mechanisms (e.g., interlocking mechanism 200) unless context suggests otherwise. For instance, interlocking mechanism 400 may primarily include the container 500, blade base 410, and the pedestal 202. In an aspect, blade base 410 may be generally similar to blade bases 120 and/or 210, however, a lip 434 of a housing 430 of the blade base 410 may comprise outwardly diverting spill moat 435. The outwardly diverting spill moat 435 may direct spilled foodstuff towards an outer perimeter of the housing 430.

Figure 9:
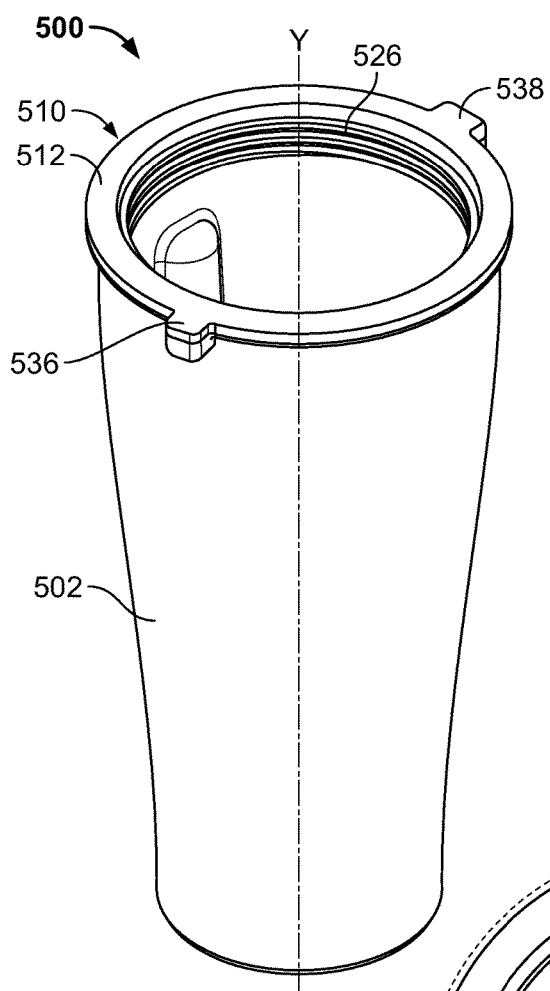
FIG. 9 is a perspective view of a blending container of an interlocking mechanism, in accordance with various disclosed aspects.
Figure 10:
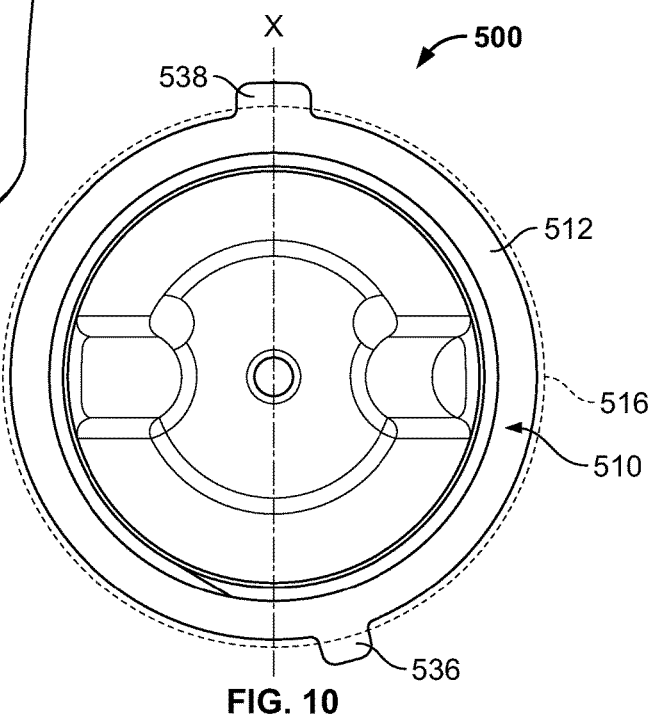
FIG. 10 is a top plan view of a blending container of an interlocking mechanism, in accordance with various disclosed aspects.

The blending container 500 may be configured to interlock or engage with the blade base 410. For instance, the blending container 500, as best illustrated in FIGS. 9-10, may comprise interlock features, such as a first tab 536 and/or second tab 538. The first tab 536 and second tab 538 may extend from a lip 512 that is proximal to an open end 510 of a body 502 and may cover a majority portion or all of the open end 510. In an aspect, the first and second tabs 536 and 538 may be configured to engage with recessed portions 436 and 438 of the blade base 410. For instance, first tab 536 may be configured to be received by recessed portion 436 and second tab 538 may be configured to be received by recessed portion 438.

In at least one embodiment, the second tab 538 may be of a similar configuration as the first tab 536, but may be of a different size. Further, the second tab 538 may be offset from the first tab 538 along the circumference of the blending container 500 at an angle that is not 180 degrees. In other words, the first tab 536 and second tab 538 are not aligned with one another. In another aspect, the recessed portions 436 and 438 may be similarly arranged and/or offset with each other. For example, the recessed portions 436 and 438 may be configured such that the first tab 536 and second tab 538 are selectively and operatively engageable with such recessed portions 436 and 438. The recessed portions 436 may be shaped and sized such that only the first tab 536 may be capable of operatively engaging it. Similarly, the recessed portions 438 may be shaped and sized such that only the second tab 538 is operatively engageable therewith. This configuration may help align the blending container 500 and blade base 410 with pedestal 202. It is noted that the interlocking mechanism 400 may include any number of tabs and/or recessed portions. It is further noted that the tabs and recessed portions may comprise different shapes and/or sizes. According to at least one embodiment, first tab 436 and second tab 438 may include one or more magnets embedded therein or otherwise attached thereto. The magnet may assist in securing the blending container 500 in any appropriate manner. In another aspect, the magnet may be utilized for or by other components, such as reed switches that may be utilized as a portion of interlocking mechanism 400.

In an example, a user may align the blending container 500 and the blade base 410. The user may utilize the first and/or second tab 536/538 as well as the recessed portion 436 and/or 438 to operatively align the blending container 500 and blade base 410. The user may then position the blending container 500 and blade base 410 to allow the recessed portions 436/438 to receive the first and second tabs 536/538. The lip 512 may be inserted within the lip 434 of the blade base 410. In an aspect, the lip 512 may comprise an outer perimeter 516 that is generally smaller than an outer perimeter 412 of lip 434. As the blending container 500 is inserted into the blade base 410, the lip 512 of the blending container 500 may contact a gasket 422 positioned between the lip 512, moat surface 414 and a side 424 of a floating bowl 420. The blending container 500 and the floating bowl 420 may be pressed together to form a seal around the gasket 422. In an embodiment, the blending container 500 may press the gasket 422 between the floating bowl 420 and the blending container 500. This may compress the gasket 422 to create a seal. The seal may be generally air and/or fluid tight. In some embodiments, this may be accomplished without having to rotate either of the blending container 500 or the floating bowl 420 (or a bowl that is otherwise fixed). For instance, blending container 500 may comprise an engaging portion 526 that may engage with an engaging portion 426 of the floating bowl 420. In an example, the engaging portion 526 may be a threaded member disposed on an internal surface of the blending container 500 and the engaging portion 426 may be a threaded member disposed on an external surface of side wall 434. The threaded members may be configured such that a user may screw or rotated, with respect to the blade base 410, the blending container 500 about axis Y. As the blending container 500 rotates, it may be drawn towards the moat support 414.

Floating bowl 420 may include a gasket ramp 423. The gasket ramp 423 may push the gasket 422 in a desired position. In an aspect, the gasket ramp 423 may allow a user to proper align the gasket, remove, and/or position the gasket.

As shown in FIGS. 7 and 8, as well as elsewhere, the blending container 500 may be rotated such that the interlocking mechanism 400 is in a second position. According to an aspect, as the blending container 500 rotates the housing 430 and the floating bowl 420 may translate towards the pedestal 202. In this manner, the spline 466 may be engaged with the splined coupler 366. Once engaged, the splined coupler 366, which may attach to a motor shaft, may drive the spline 466 to rotate a blade assembly 460 of the blade base 410.

In at least one embodiment, without the blending container 500 present and engaged, (e.g., as shown in FIGS. 3 and 4), the jacking feet member 480 is protruding on the underside of the blade base 410. This provides a physical stop between the splined coupler 366 and the spline 466. Therefore, a motor cannot drive the blade assembly 460. As the user brings the blending container 500 to the blade base 410, an engaging portion 486 of the floating bowl may engage with an engaging portion 482 of the jacking feet member 480, as described herein. While embodiments may refer to engaging portions 482 and 486 as threaded members, it is noted that the engaging portions 482 and 486 may comprise any appropriate configurations.

As the user tightens (seals) the blending container 500 to the blade base 410 by turning the blending container 500 relative to the blade base 410, the engaging portions 482 and 486 may also draw the housing 430, floating bowl 420, blade assembly 460, and other operative components towards the pedestal 200. In an example, as the blending container 500 rotates, the floating bowl 420 may rotate and alter the relative positions of the floating bowl 420 and the pedestal 202 and/or the splined coupler 366. This removes the physical stop (e.g., gap or open area) surrounding the splined coupler 366, as shown in FIGS. 5 and 6. This allows the user to use a blending system. It is noted that the user may also disengage the interlocking mechanism 400 by rotating the blending container 500 in an opposite direction about axis Y, thereby increasing a relative distance of the spline 466 and the splined coupler 366 such that the physical stop may prevent a user from operating a blender, which may prevent rotation of blade assembly 466.

Figure 12:
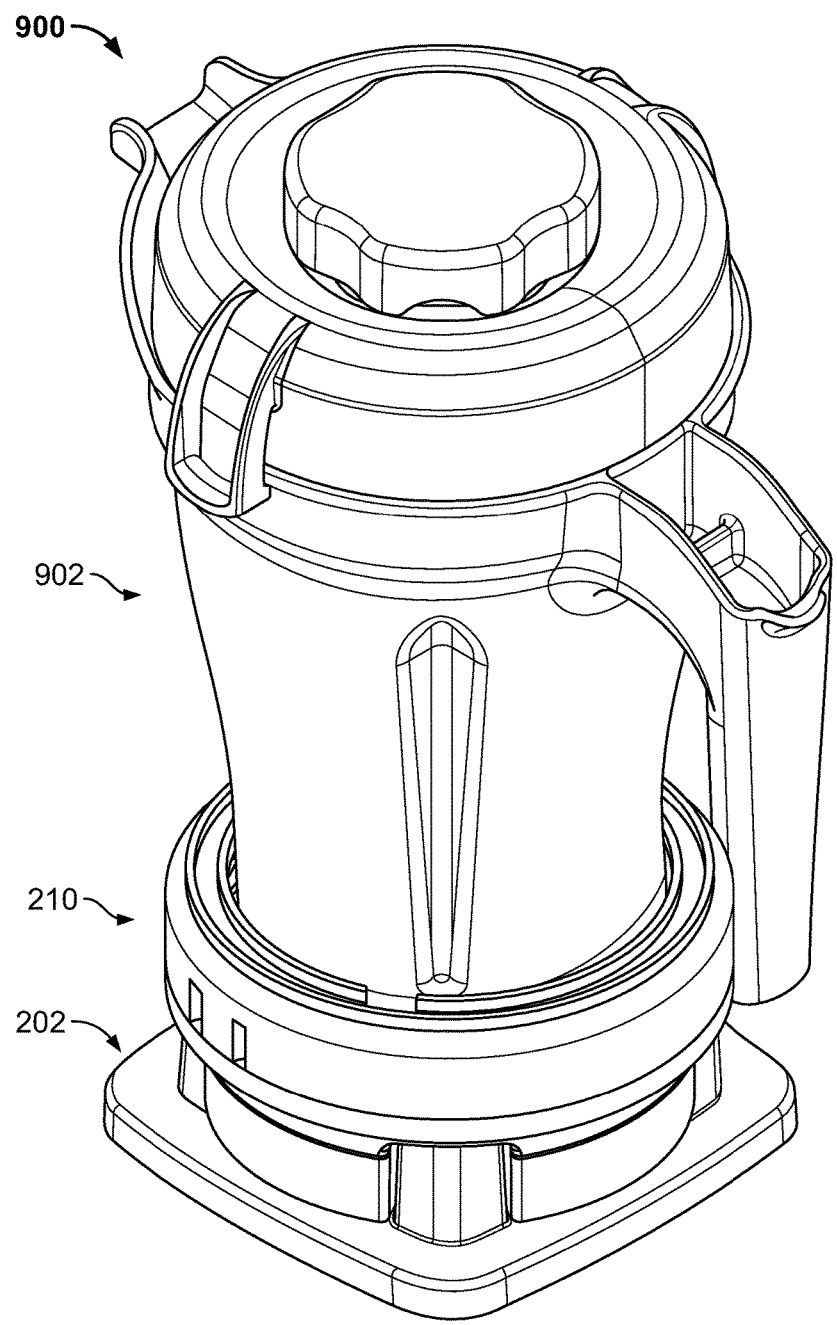
FIG. 12 is a perspective view of a blade base with a large format blending container, in accordance with various disclosed aspects.
Figure 13:
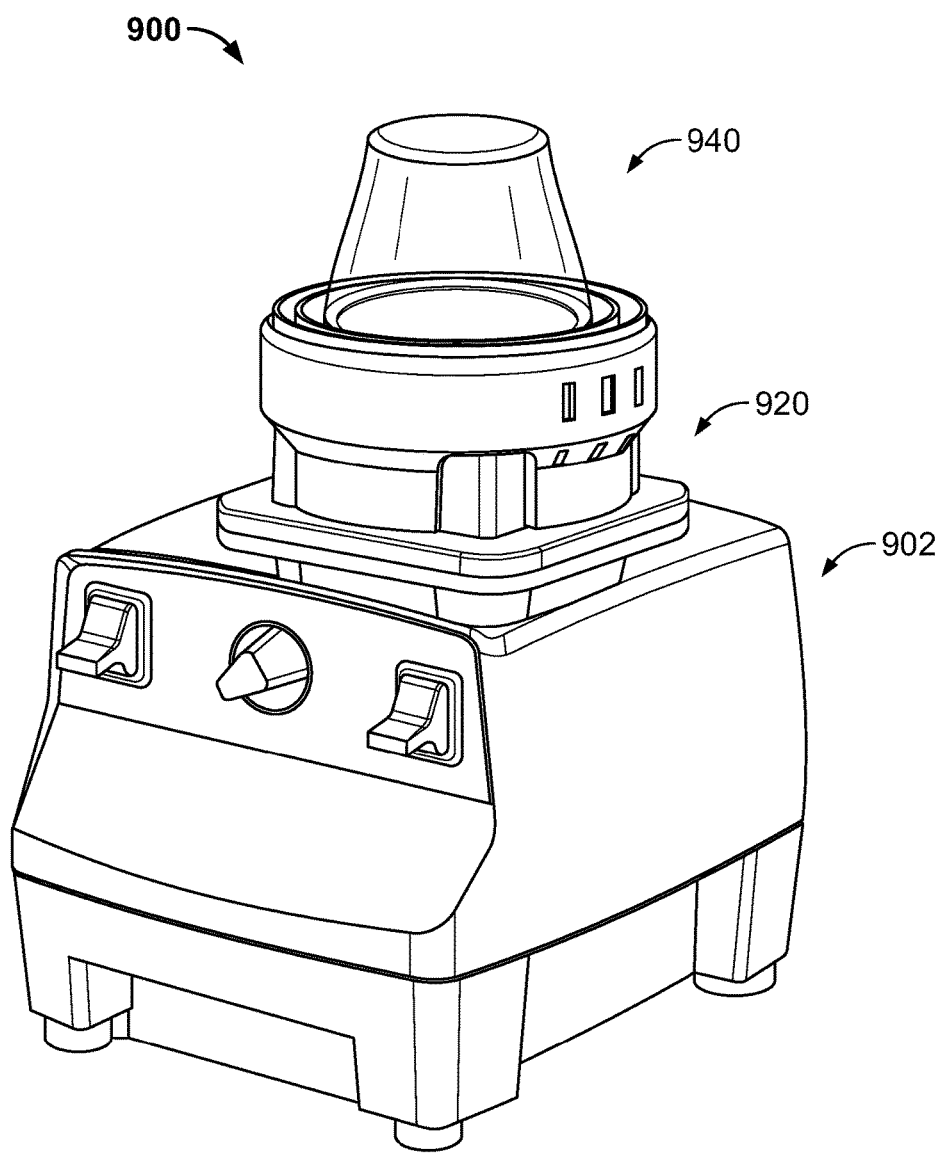
FIG. 13 is a perspective view of a blade base with a small format blending container, in accordance with various disclosed aspects.

FIG. 12 is an interlocking blending mechanism 900 in a locked or interlocked position. As depicted, interlocking mechanism 900 may include the blade base 210, the pedestal 202, and a blending container 902. In an aspect, the blending container 902 may be a large format or small format blending container 902, in a pitcher-like design. While depicted as a pitcher-shaped container, it is noted that the blending container 902 may comprise other appropriate shapes and/or sizes. For instance, as shown in FIG. 13, a blending system 1000 may include a blender base 1002, a blade base 1020, and a blending container 1040. The blending container 1040 may comprise a relatively smaller container than blending containers 140, 500, and/or 920. For instance, the blending container 1040 may comprise a spice grinding container.

Figures 14, 15:
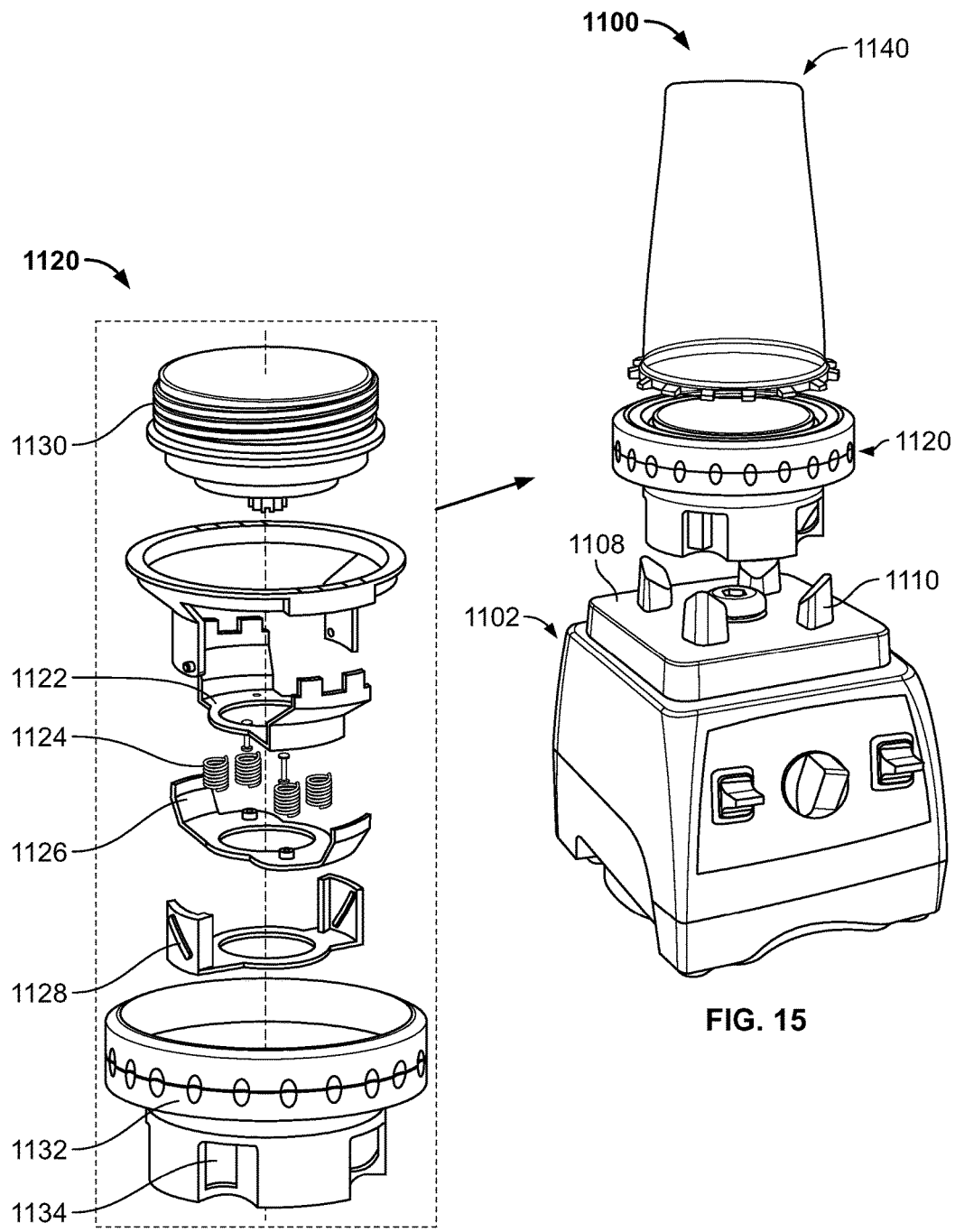
FIG. 14 is an exploded view of a blade base, of a blending system, that may prevent coupling of the blade base with a pedestal, in accordance with various disclosed aspects.
FIG. 15 is a perspective view of the blending system that may prevent coupling of the blade base with a pedestal, in accordance with various disclosed aspects.

FIGS. 14 and 15 are an embodiment of a blending system 1100 in accordance with various disclosed aspects. The blending system 1100 may primarily include blender base 1102 (which may include pedestal 1108), a blade base 1120 and a blending container 1140. In an aspect, the blade base 1120 may include a drive 1122, pins 1124, a cam 1126, and a rotating member 1128. In another aspect, the blade base 1120 may include a bowl 1130 that may comprise a blade assembly (not shown). Components of the blade base 1120 may be configured to rotate the rotating member 1128. When the blending container 1140 is not engaged with the blade base 1120, the rotating member 1128 is in a first position to provide a hard stop that prevents the blade base 1120 from engaging all posts 1110 of the pedestal 1108. For example, the rotating member 1128 provides a physical block or obstruction in one or more windows 1134 of a housing 1132 of blade base 1120.

When the blending container 1140 is engaged with the blade base 1120, the rotating member 1128 is in a second position to allow the blade base 1120 from engaging all posts 1110 of the pedestal 1108 (or alternatively a portion of the posts 110). In an aspect, the rotating member 1128 may be rotated from the first position to the second position when the blending container 1140 is engaged with the blade base 1120. In the second position, the rotating member 1128 does not obstruct windows 1134. When not obstructed, the windows 1134 may accept posts 1110. This may allow the blade base 1120 to operatively attach to the blender base 1102 and may allow for driving of the blade assembly (not shown).

After the blending container 1140 is engaged with the blade base 1120 (e.g., after a blending process is complete) a user may rotate the blending container 1140 in an opposite direction to disengage the blending container 1140 from the blade base 1120. As the user disengages (e.g., rotates) the blending container 1140, the rotating member 1128 may generally simultaneously rotate to the first position, thereby forming the hard stop to prevent a user from engaging the blade base 1120 with the blender base 1108. Therefore, a drive spline of the motor of the blender base 1102 cannot engage with a blade assembly (e.g., via a coupling) of the blade base 1120 when the rotating member 1128 is in the first position (e.g., the blending container 1140 and blade base 1120 are not properly engaged). As the blending container 1140 engages the hard stop moves (e.g., via the cam 1126), allowing all posts 1110 of the pedestal 1108 to engage with the blade base 1120, and therefore the motor with the blade assembly. In at least one embodiment, the hard stop may provide a physical barrier between a spline of a blade assembly and a splined coupling of a blender base 1102.

Figures 16, 17:
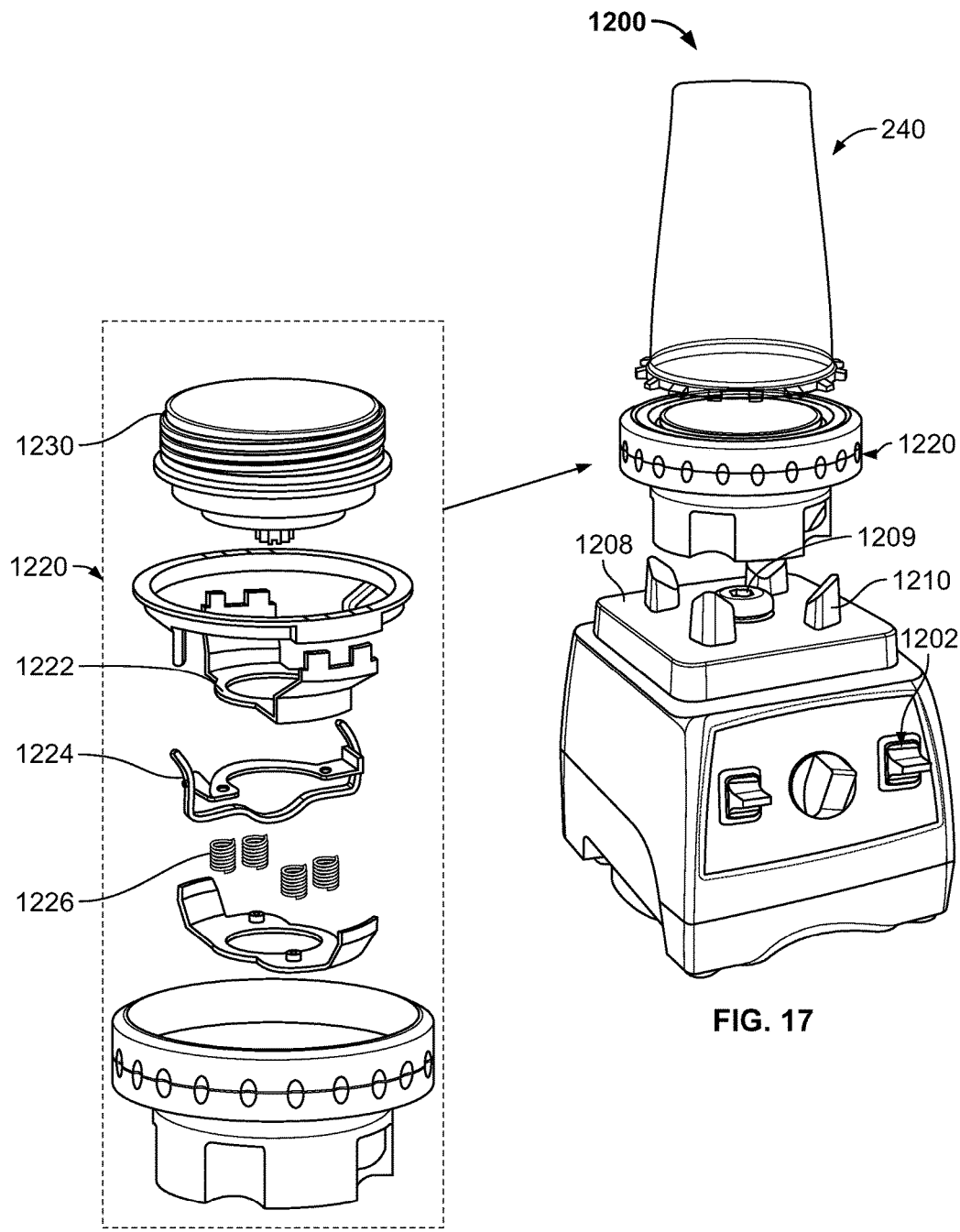
FIG. 16 is an exploded view of a blade base, of a blending system, with a physical stop, in accordance with various disclosed aspects.
FIG. 17 is a perspective view of the blending system with the blade base with a physical stop, in accordance with various disclosed aspects.

FIGS. 16 and 17 are an embodiment of a blending system 1200 in accordance with various disclosed aspects. The blending system 1200 may primarily include blender base 1202 (which may include pedestal 1208), a blade base 1220 and a blending container 1240. In an aspect, the blade base 1220 may include a drive 1222, blocking member 1224, and pins 1226. Components of the blade base 1220 may be configured to position the blocking member 1224 to prevent (e.g., when the blending container 1240 is not engaged with the blade base 1220) or allow (e.g., when the blending container 1240 is engaged with the blade base 1220) operation of a blade assembly (not shown) disposed within a bowl 1230. When the blending container 1240 is not engaged with the blade base 1220, the blocking member 1224 (e.g., in a first position) may prevent the blade base 1220 from engaging the pedestal 1208. More specifically, the blocking member 1224 may rotate, pivot or otherwise move to block or otherwise prevent a spline of the blade assembly from engaging with a splined coupling 1209 of the pedestal 1208. When the blending container 1240 is engaged with the blade base 1220, the blocking member 1224 (e.g., in a second position) may be positioned to allow the blade base 1220 to engage the pedestal 1208 or more specifically allowing the spline of the blade assembly to engage with the splined coupling 1209 of the pedestal 1208. For instance, the blocking member 1224 (e.g., in a first position) may cover the spline 1209 of a blade assembly to prevent the spline from engaging with a coupling of the blender base 1202. Therefore, if a user tries to engage the spline without the blending container 1240 present, the blocking member 1224 may prevent the spline from engaging. Once the blending container 1240 is positioned within the tabs within the blade base 1220, the user may rotate the blending container 1240 with respect to the blade base 1220, to move a relative position of the blocking member 1224 (which may also rotate and/or may be in a fixed position) and allow the spline to engage with a splined coupling of the blender base 1202. In at least one embodiment, the blending container 1240 may be configured to allow engagement with a quarter turn about an axis. In an aspect, the blocking mechanism 1224 may comprise a shield comprising plastic, metal, or the like.

When the blending container 1240 is disengaged with the blade base 1220, the blocking member 1224 (e.g., in a first position) may be positioned to allow the blade base 1220 to engage the pedestal 1208 or more specifically to allow the spline of the blade assembly to engage the splined coupling 1209 of the pedestal 1208. For instance, the blocking member 1224 (e.g., in the second position) may allow the spline of the blade assembly to engage the splined coupling 1209 of the pedestal 1208. When a user turns the blending container 1240 to disengage the blending container 1240 from the blade base 1220, the blocking member 1224 may be simultaneously position in the second position to prevent the spline from engaging with a coupling 1209 of the blender base 1202. In at least one embodiment, the hard stop may provide a physical barrier between a spline of a blade assembly and a splined coupling of a blender base 1202.

Figure 18:
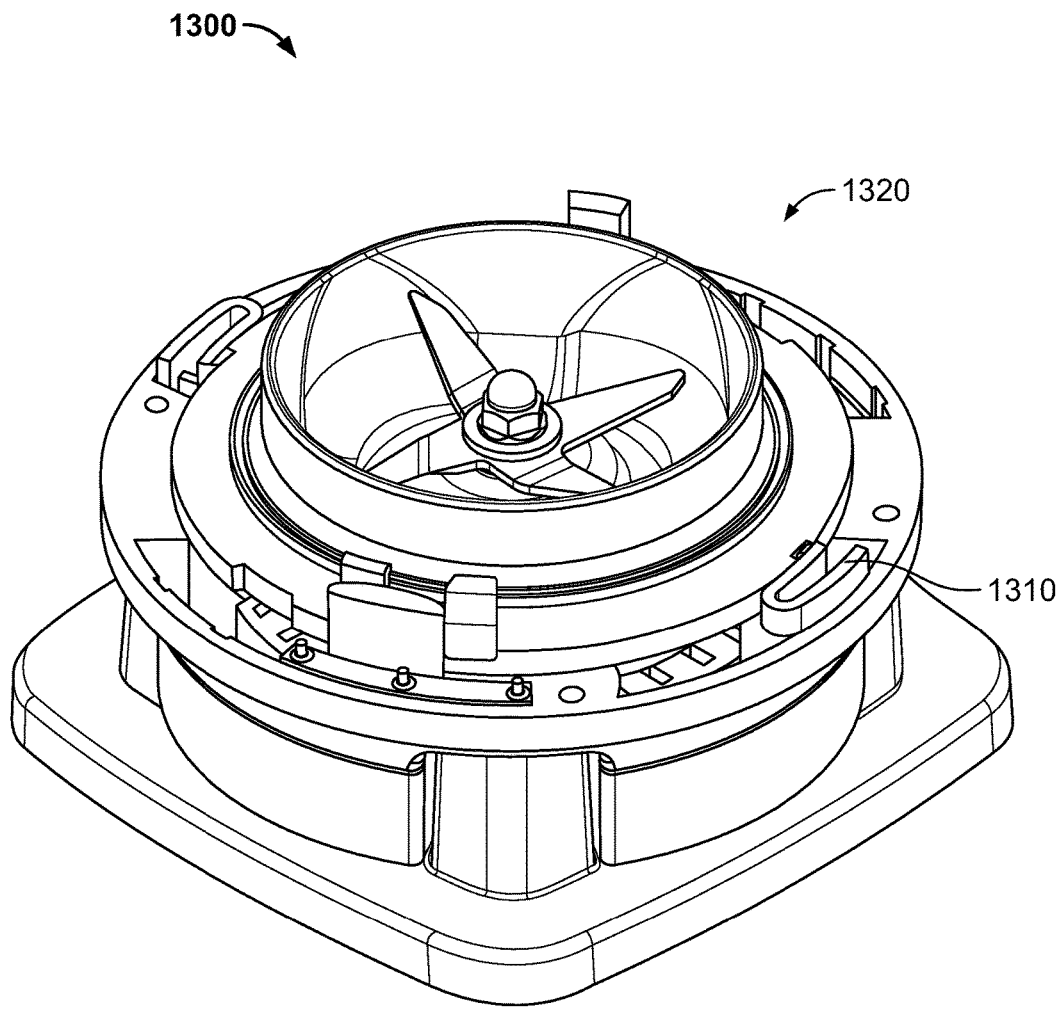
FIG. 18 is a partial cross-sectional view of a blade base with a detent, in accordance with various disclosed aspects.

FIG. 18 is a portion of a blending system 1300. Aspects of blending system 1300 may be utilized with the various other described embodiments. The blending system 1300 may include a blade assembly 1320. The blade assembly 1320 may include one or more detent catch 1310. The detent catch 1310 may configured to prevent back driving of a blending container during operation, such as back driving as a result of fluid torque during operation of the blender system. The detent catch 1310 may be configured such that the force to overcome the detent catch 1310 is greater than the blending torque (e.g., fluid torque), but less than max user torque (e.g., torque that a user applies). It is noted that embodiments may utilize other mechanisms to retain a blending container, such as magnets, latches, or other fasteners.

Figure 19:
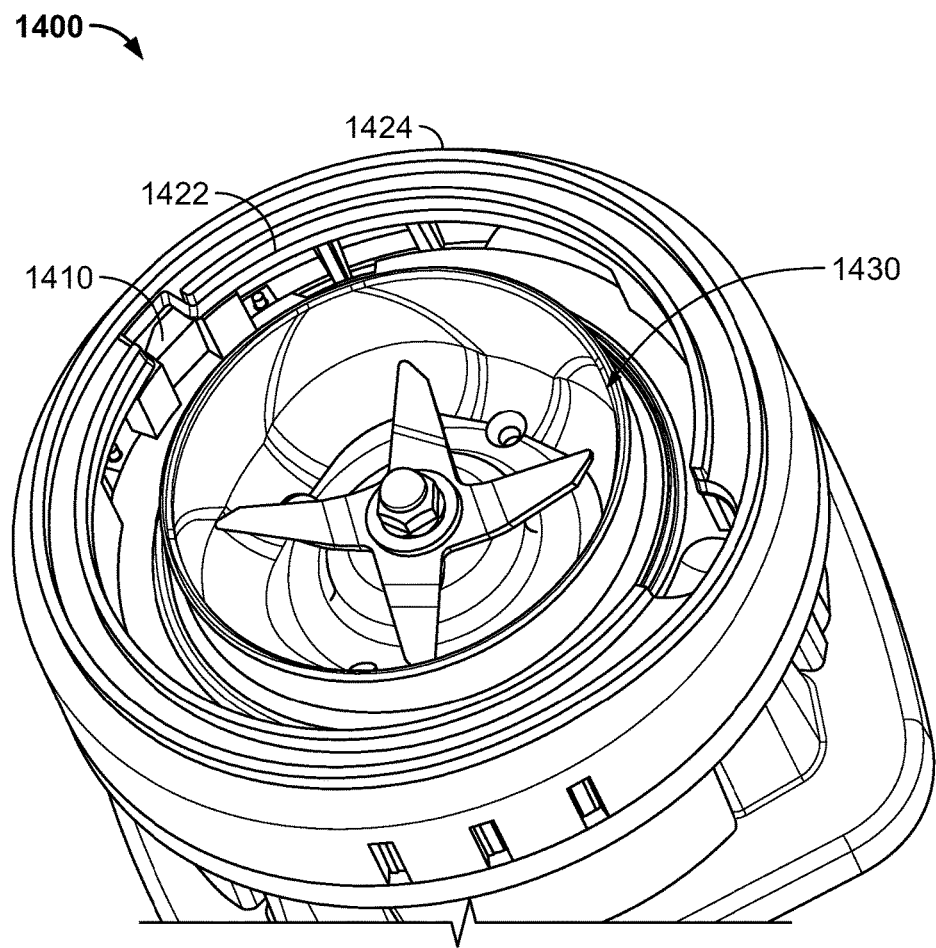
FIG. 19 is a top perspective view of a blade base with a spring clip, in accordance with various disclosed aspects.

FIG. 19 is a blade base 1400 in accordance with various disclosed aspects. The blade base 1400 may include a spring clip 1410 disposed along an inner wall 1422 of a housing 1424. In an aspect, the spring clip 1410 may prevent a user from rotating a blade base by hand without a blending container attached thereto. In an aspect, the spring clip 1410 may prevent tampering with an interlocking mechanism.

The spring clip 1410 may comprise a spring that catches a tab (not shown) sticking up on the floating bowl 1430. This may prevent the floating bowl 1430 from rotating. As a user assembles the blending container into the blade base 1400, tabs of the blending container may displace the spring clip 1410 to release a tab of the floating bowl. Once released, the floating bowl 1430 may translate towards a motor coupling when a user rotates the blending container.

Figure 20:
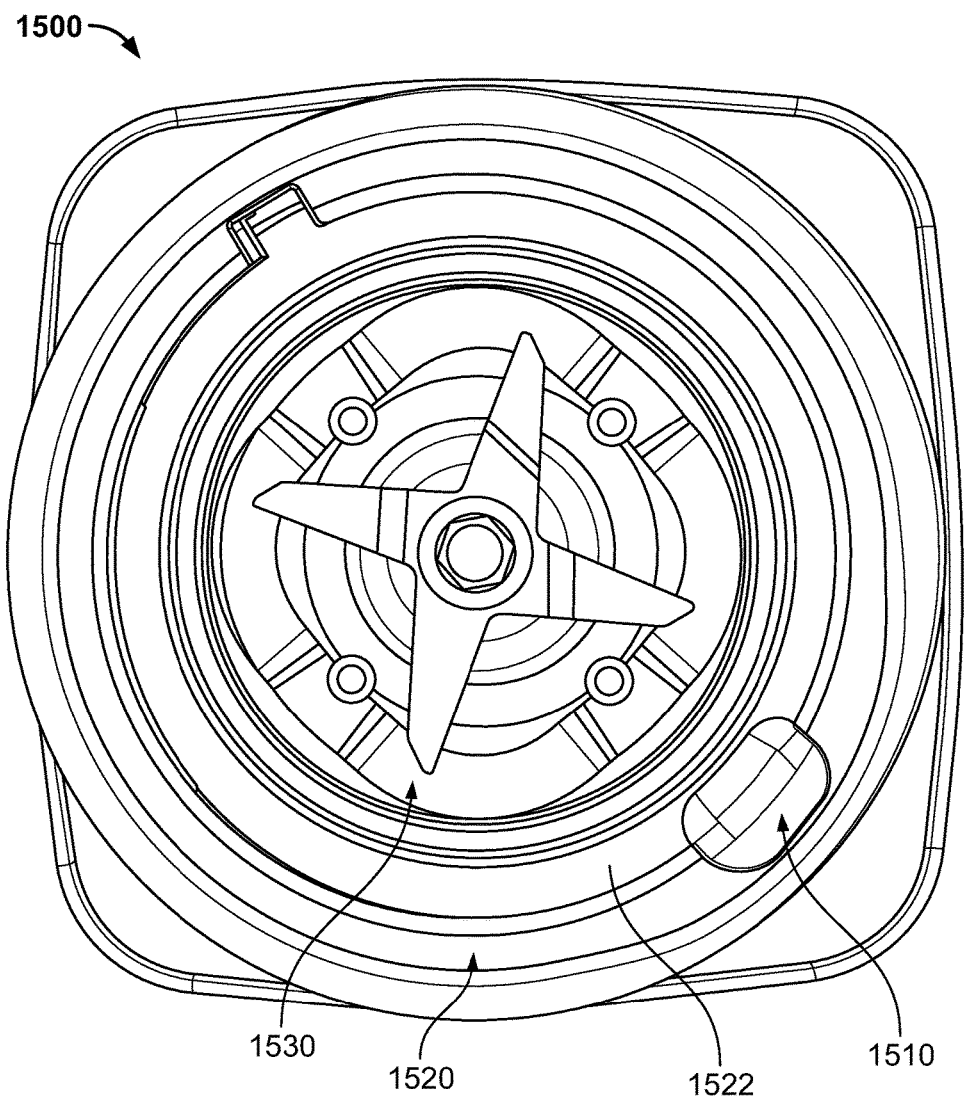
FIG. 20 is a top perspective view of a blade base with a cutout portion, in accordance with various disclosed aspects.

FIG. 20 is a blade assembly 1500 which may comprise a housing 1520 and a floating bowl 1530. In an aspect, a gasket 1522 may be disposed within the housing 1520, such as between the housing 1520 and the floating bowl 1530. According to at least one embodiment, a cutout portion 1510 may be formed as an indent or areas substantially relieved of material. The cutout portion 1510 may be formed through at least a portion of the housing 1520 and/or the floating bowl 1530. In an aspect, the cutout portion 1510 may allow a user to add or remove the gasket 1522. For instance, the user removes the gasket 1522 for cleaning and/or may replace the gasket 1522 once cleaned. In an aspect, the cutout portion 1510 may allow for increased user satisfaction and/or increased usability.

Figure 21:
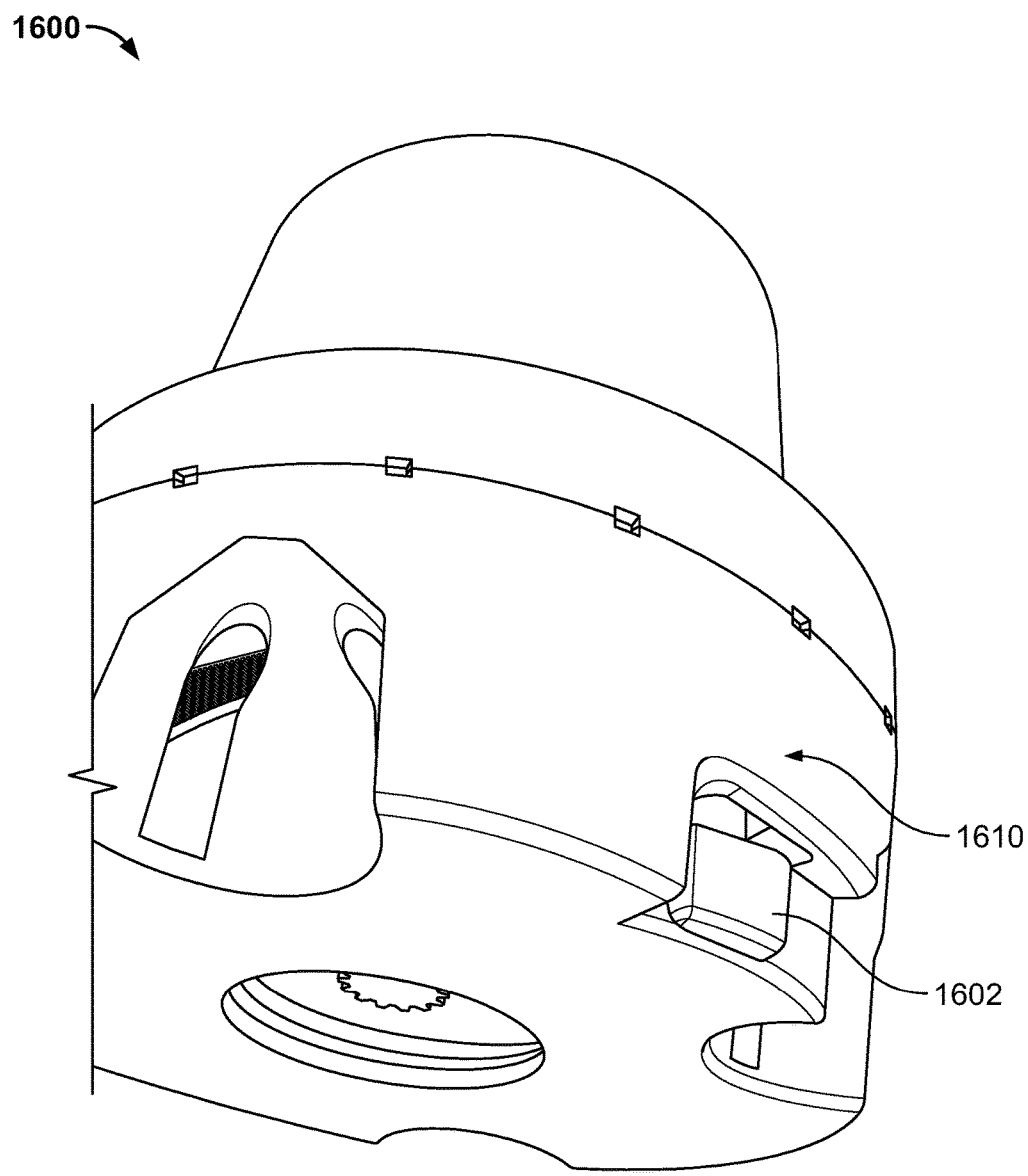
FIG. 21 is a side perspective view of a blade base with an anti-rotation actuator, in accordance with various disclosed aspects.
Figure 22:
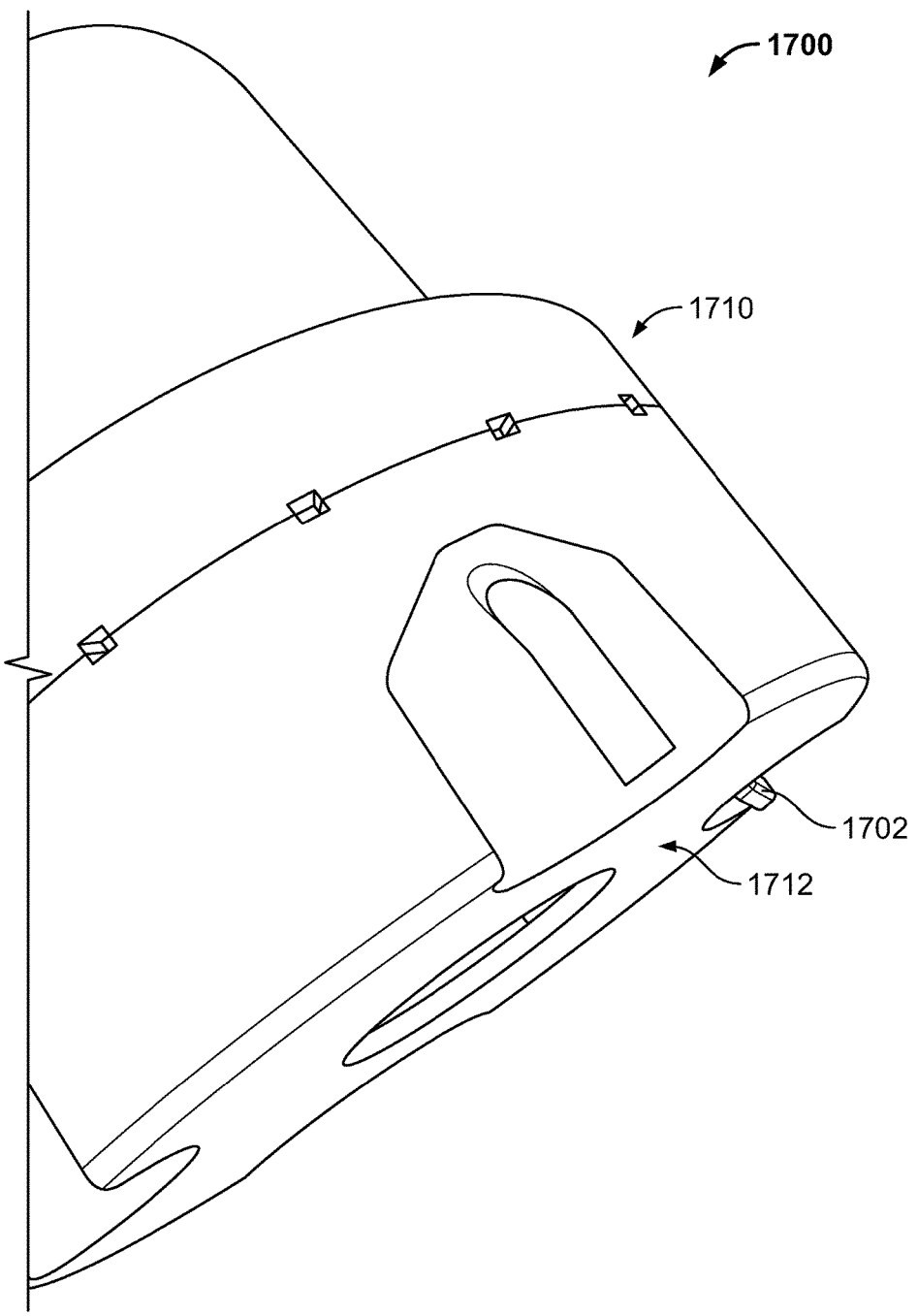
FIG. 22 is a side perspective view of a blade base with an automatic anti-rotation actuator, in accordance with various disclosed aspects.

FIGS. 21 and 22 depict blade bases 1600 and 1700. It is noted that aspects of blade base 1600 and/or 1700 may be utilized with other systems, such as blending system 1200, 1300, etc. In an aspect, blade bases 1600 and 1700 may respectively comprise manual and automatic actuators. When a manual actuator is actuated (e.g., depressed in FIG. 21), a container may be releasable (e.g., may be rotated off). When an automatic actuator is actuated (e.g., depressed in FIG. 21), the container may be interlocked (e.g., not releasable). In an aspect, when the automatic actuator is released (e.g., a blade base is removed from a blender base), the container may be releasable (e.g., may be rotated off). The blade bases 1600 and/or 1700 may prevent a user from manually disengaging a blending container and/or may prevent operation of a blender (e.g., torque) from causing the blending container from rotating.

With reference now to FIG. 21, the blade base 1600 may comprise a manual anti-rotation actuator 1602 disposed along an outer wall 1610. When a blending container is attached to the blade base 1600, the anti-rotation actuator 1602 prevents removal of the blending container from the blade base 1600. This may prevent the blending container from disengaging with the blade base 1600, such as due to fluid torque during a blending process. For example, the blending container is prevented from being unscrewed or detached from the blade base 1600 (e.g., such as due to back drive) when the anti-rotation actuator 1602 is not actuated (e.g., not depressed). In another aspect, a user may depress (e.g., actuate) the anti-rotation actuator 1602 to allow the blending container to be removed from the blade base 1600. For example, after a blending process, a user may remove the blending container and attached blade base 1600 from a blender base. The user may then press the anti-rotation actuator 1602 to allow the user to remove (e.g., rotate off) the blade base 1600 from the blending container.

Turning to FIG. 22, blade base 1700 may comprise an automatic anti-rotation actuator 1702 disposed along an outer wall 1710 of the blade base 1700. The anti-rotation actuator 1702 may be positioned such that it is actuated (e.g., depressed) when the blade base 1700 is engaged with a blender base. As shown in FIG. 23, the anti-rotation actuator 1702 may be positioned along a bottom surface 1712. When the blade base 1700 is engaged with a blender base, the bottom surface 1712 may be adjacent to or in contact with a blender base. This may allow the blender base to automatically depress the anti-rotation actuator 1702. In another aspect, the automatic anti-rotation actuator 1702 may engage a stop or other feature or a blender base.

The automatic anti-rotation actuator 1702 may prevent back driving of the container due to fluid torque. For instance, the automatic anti-rotation actuator 1702 may be activated (e.g., depressed) when the blade base 1700 is attached to a blender base. When activated, the anti-rotation actuator 1702 may prevent removal (e.g., rotation) of a blending container. In an aspect, if the blade base 1700 is not attached to the blender base, the button would not be activated and a blending container could be decoupled from the blade base 1700.

Although the embodiments of the present teachings have been illustrated in the accompanying drawings and described in the foregoing detailed description, it is to be understood that the present teachings are not to be limited to just the embodiments disclosed, but that the teachings described herein are capable of numerous rearrangements, modifications and substitutions.

What is claimed is:

1. A blending system comprising:
   a blender base, the blender base comprising a motor, wherein the motor comprises a coupler operatively engageable with a blade assembly;
   a blade base comprising the blade assembly, a floating bowl coupled with the blade assembly, and a jacking member coupled with the floating bowl; and
   a blending container comprising a closed end and an opened end and operatively engageable with the blade base,
   wherein the floating bowl is translatable relative to the jacking member from a first position to a second position by at least one of disengaging or engaging the open end of blending container with the blade base.

2. The blending system of claim 1, wherein:
   the blending container comprises a first engaging portion, and
   the floating bowl comprises a second engaging portion operatively engageable with the first engaging portion.

3. The blending system of claim 2, wherein the first engaging portion and the second engaging portion comprise threaded portions.

4. The blending system of claim 1, wherein the blending container and the floating bowl are operatively engageable by rotating the blending container relative to the blade base.

5. The blending system of claim 4, wherein the floating bowl is translated between the first position and the second position by the rotation of the blending container relative to the blade base.

6. The blending system of claim 4, wherein the floating bowl is disposed in the first position when the blending container and the blade base are not operatively engaged.

7. The blending system of claim 6, wherein when the floating bowl is disposed in the first position and when the blade base is operatively engaged with the blender base, the blade assembly is operatively spaced apart from the coupler of the blade base so that the motor cannot drive the blade base.

8. The blending system of claim 4, wherein the floating bowl is disposed in the second position when the blending container and the blade base are operatively engaged.

9. The blending system of claim 8, wherein when the floating bowl is disposed in the second position and when the blade base is operatively engaged with the blender base, the blade assembly is operatively engageable with the coupler of the blade base so that the motor may drive the blade base.

10. A blending system comprising:
   a blender base encasing a motor comprising a motor coupling;
   an apron disposed on the blender base and comprising at least one protrusion;
   a blending container; and
   a blade base selectively engaged with the apron, the blade base comprising:
      a blade assembly operatively engageable with the motor coupling;
      at least one alignment member that operatively receives the at least one protrusion to prevent rotation of the blade base when the blade base is operatively engaged with the apron;
      a floating bowl operatively engaged with the blending container; and
      at least one rotating member coupled to the floating bowl, wherein a position of the at least one rotating member is movable based on the position of the floating bowl, and wherein the position of the rotating member is movable between a position that prevents the blade assembly from engaging with the motor coupling and a position that allows operative engagement of the blade assembly with the motor coupling.

11. The blending system of claim 10, wherein the blending container, when engaged with the blade base, is configured to rotate about an axis with respect to the blade base.

12. The blending system of claim 11, wherein rotation of the blending container relative to the blade base, moves the position of the rotating member.

13. The blending system of claim 10, wherein rotation of the blending container in a first direction relative to the blade base, moves the position of the rotating member to allow operative engagement of the blade assembly with the motor coupling, and operatively engages the blending container with the blender base.

14. The blending system of claim 10, wherein rotation of the blending container in a first direction relative to the blade base, moves the position of the rotating member to prevent operative engagement of the blade assembly with the motor coupling, and operatively disengages the blending container with the blender base.

15. The blending system of claim 10, wherein the rotating member operatively blocks the at least one alignment member from receiving the at least one protrusion when the blending container is not engaged with the blade base.

16. The blending system of claim 10, wherein the rotating member operatively blocks a shaft of the blade base from engaging with the motor coupling when the blending container is not engaged with the blade base.

17. A blade base for a blending system comprising a blending container and a blender base, the blade base comprising:
   a blade assembly comprising a splined coupler, and operatively engageable with a motor of the blender base;
   a bowl comprising a bottom and a side wall, wherein the bowl is coupled with the blade assembly and operatively engageable with the blending container;
   wherein engaging the blending container and the bowl creates a seal between the blending container and the bowl, and allows the splined coupler to be engaged with the motor of the blender base.

18. The blending system of claim 17, wherein rotation of the blending container translates the bowl between first position and a second position, wherein the first position prevents the splined coupler from engaging with the motor, and the second position allows the splined coupler to engage with the motor.

19. The blending system of claim 17, further comprising a gasket disposed between the blending container and the bowl when the blending container is operatively engaged with the blade base.

20. The blending system of claim 17, wherein the blade base comprises a first detent that operatively locks together the blending container and the blade base.

* * * * *